United States Patent
Sahin et al.

(10) Patent No.: US 12,438,899 B2
(45) Date of Patent: Oct. 7, 2025

(54) APPLICATION SLICING FOR ACTIVE DEFENSE

(71) Applicant: SAP SE, Walldorf (DE)

(72) Inventors: Merve Sahin, Antibes (FR); Cedric Hebert, Mouans Sartoux (FR)

(73) Assignee: SAP SE, Walldorf (DE)

( * ) Notice: Subject to any disclaimer, the term of this patent is extended or adjusted under 35 U.S.C. 154(b) by 215 days.

(21) Appl. No.: 18/237,834

(22) Filed: Aug. 24, 2023

(65) Prior Publication Data

US 2025/0071133 A1    Feb. 27, 2025

(51) Int. Cl.
*H04L 9/40* (2022.01)

(52) U.S. Cl.
CPC ...... *H04L 63/1433* (2013.01); *H04L 63/0236* (2013.01); *H04L 63/1491* (2013.01)

(58) Field of Classification Search
CPC ........... H04L 63/1433; H04L 63/1425
See application file for complete search history.

(56) References Cited

U.S. PATENT DOCUMENTS

| | | | | |
|---|---|---|---|---|
| 8,533,328 | B2 * | 9/2013 | Jeon | G06F 21/577 709/224 |
| 2008/0163354 | A1 * | 7/2008 | Ben-Shalom | H04L 63/1491 726/12 |
| 2017/0109534 | A1 * | 4/2017 | Compagna | G06F 21/577 |
| 2024/0223595 | A1 * | 7/2024 | Bakshi | H04L 63/0236 |
| 2025/0071133 | A1 * | 2/2025 | Sahin | H04L 63/1433 |

OTHER PUBLICATIONS

"OWASP Top Ten." https://owasp.org/www-project-top-ten/, visited Jun. 13, 2023, 5 pages.
M. Weiser, "Program slicing," IEEE Transactions on Software Engineering, 10(4):352-357, Jul. 1984, 6 pages.
Neelamegam, et al., "Program Slicing Techniques and its Applications," International Journal of Software Engineering & Applications, vol. 2, No. 3, Jul. 2011, 15 pages.
J. Zhao, "A slicing-based approach to extracting reusable software architectures," Proceedings of the Fourth European Conference on Software Maintenance and Reengineering, 2000, 9 pages.
F. Ricca et al., "Web application slicing," Proceedings IEEE International Conference on Software Maintenance. ICSM 2001, 2001, pp. 148-157, 10 pages.

(Continued)

*Primary Examiner* — Ponnoreay Pich
(74) *Attorney, Agent, or Firm* — Klarquist Sparkman, LLP

(57) ABSTRACT

Application slicing can be applied to a web application with web application endpoints so that only the endpoints accessible by a given role are present in a given slice. Thus, role-based application slicing can be implemented. Subsequently, when requests for access to endpoints are received, the requests can be directed to a slice associated with a role of the user identifier making the request. Vulnerability chaining can thus be avoided because functionality in the slice is limited to that appropriate for the role of the user. The technologies can also be leveraged by extracting removed endpoints that can be used to detect intrusion in an active defense scenario.

20 Claims, 11 Drawing Sheets

(56) References Cited

OTHER PUBLICATIONS

Qian et al., "RAZOR: A Framework for Post-depolyment Software Debloating," Usenix'19, https://www.usenix.org/conferencee/usenixsecurity19/presentation/qian, 3 pages.

Azad et al., "Less is More: Quantifying the Security Benefits of Debloating Web Applications," Usenix'19, https://www.usenix.org/conference/usenixsecurity 19/presentation/azad, 3 pages.

Boomsma et al., "Dead Code Elimination for Web Systems written in PHP: Lessons Learned from an Industry Case," In 2013 IEEE International Conference on Software Maintenance (pp. 511-515), 2012, 5 p.

Ponta et al., "The Used, the Bloated, and the Vulnerable: Reducing the Attack Surface of an Industrial Application," 2021 IEEE International Conference on Software Maintenance and Evolution (ICSME), 2021, 4 pages.

Joern, "The Bug Hunter's Workbench," https://github.com/joernio/joern, visited Jun. 19, 2023, 5 pages.

Pavlich-Mariscal, "Role Slices and Runtime Permissions: Improving an AOPbased access control schema," *MODELS'05*, ACM, 2005, 6 pages.

"Overview," Joern Documentation, https://docs.joern.io/home, visited Jun. 19, 2023, 2 pages.

* cited by examiner

APPLICATION SLICING FOR ACTIVE DEFENSE

FIELD

The field generally relates to computer network security and role-based access control.

BACKGROUND

Web applications are a popular mechanism for providing software functionality over a computer network; however, they are open to a large attack surface because they can present a public entry point to information systems. With the increasing rate of phishing attacks, attackers can gain access to an application via stolen credentials and search for vulnerabilities to leak application data or gain code execution privileges on the web server, leading to serious security breaches.

Accordingly, there remains room for improving the security of web applications.

DETAILED DESCRIPTION

Example 1

Overview

As noted, web applications are a popular mechanism for providing software functionality over a computer network; however, they are open to a large attack surface. Attackers can gain access to an application via stolen credentials and search for vulnerabilities to leak application data or gain code execution privileges on the web server, leading to serious security breaches. Within the web attack surface, the OWASP foundation has recently listed broken access control vulnerabilities as the most common web application security risk, noting that 94% of the applications tested contained one form of such vulnerability.

As described herein, the attack surface of a web application can be decreased by slicing the application code according to role status in a role-based accessed control security model defined in the application (e.g., role-based application slicing). Functionality not intended to be available to (e.g., not ordinarily accessible to) a given role can be left out of the web application slice designated for the given role status. Requests to web application endpoints are directed to slice based on role status. Accordingly, an attempt to access an endpoint not permitted by the role status will fail.

Further, it is possible to leverage the process to extract attack detection points (e.g., calls to unallowed endpoints) that can be used to monitor attempts to exploit authorization and access control weaknesses. Appropriate counter-intrusion actions can then be taken.

Therefore, the technologies described herein can reduce the number of potential vulnerabilities in a web application. As described herein, the technologies can also actively detect attackers who will attempt to elevate their privileges or access unauthorized data.

As described herein, plural copies of a web application can be created that correspond to the functionality supporting (e.g., functionality required by, functionality intended to be executed via) different role statuses (e.g., role or authentication status) defined in the application. Thus, a threat actor who logs into the application with a certain role will only have access to the server-side source code relevant to the endpoints and HTTP methods that the role is allowed to access. Any additional functionality is removed from the web application slice for the role.

Other techniques such as active defense via detection of requests to removed endpoints can be used as described herein.

The described technologies thus offer considerable improvements over conventional web application security techniques.

Example 2

Example System Implementing Role-Status-Based Web Application Slices

Figure 1:
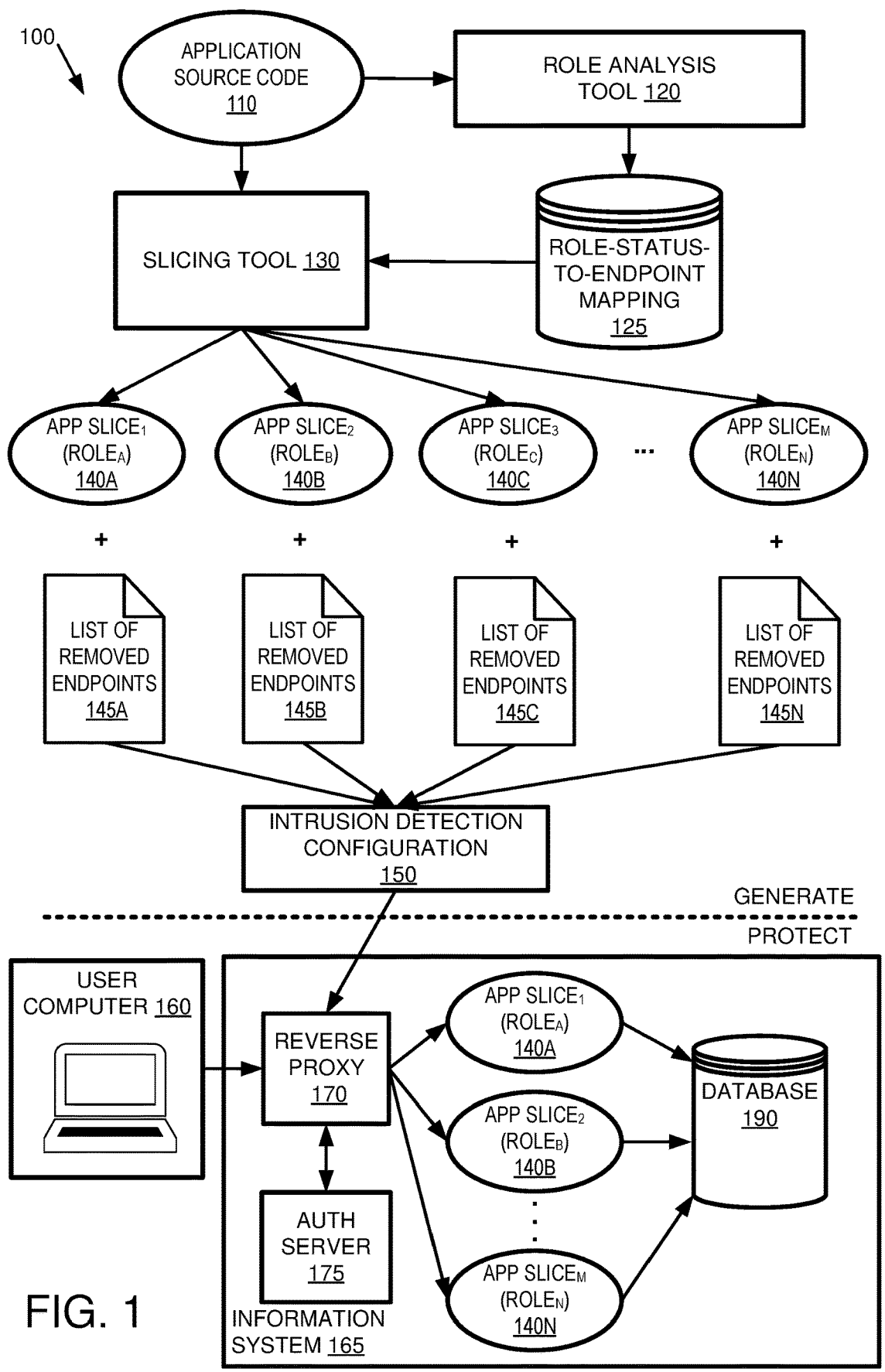
FIG. 1 is a block diagram of an example system implementing role-status-based web application slices.

FIG. 1 is a block diagram of an example system 100 implementing role-status-based web application slices. In the example, the system 100 can include a complete version of a web application in the form of source code. As shown, a role analysis tool 120 can be used to determine a role-status-to-endpoint mapping 125. The slicing tool 130 can take both the application and the mapping 125 as input and generate a plurality of slices 140A-N of the application. The slices are designated for respective role statuses (e.g., by a role-status-to-slice mapping for role-based web application slicing, per-role web application slices, role-specific web application slices, or the like). In practice, the user identifier status of "unauthenticated" can be treated as a role status (e.g., an application slice is created for unauthenticated users), a role, or treated as a special case.

As described herein, a list of removed endpoints 145A-N can be extracted as well, and for use for intrusion detection configuration 150. In practice, the removed endpoints can be inferred from the mapping of roles to endpoints. The configuration 150 can indicate how to handle attempts to access endpoints by unauthenticated users or by users authenticated in a role for which access to the endpoint is not allowed (e.g., the endpoint was removed during slicing). For example, the configuration 150 can indicate when to engage in deceptive response, such as routing a request for processing to a honeypot that emulates processing by the endpoint.

After the web application slices have been generated, they can then be used to protect the web application in a production environment. In the example, a user computer 160 (e.g., connected to the information system 165 via a network) attempts to access the web application via endpoints, and requests for processing by web application endpoints are directed to a reverse proxy 170 that directs requests to an appropriate slice 140A-N based on a role of the requesting user identifier (e.g., from the user computer 160). For example, the proxy 170 can determine the appropriate slice based on a role-status-to-slice mapping and direct the request to the mapped slice. As described herein, the reverse proxy can also check a list of removed endpoints or a role-status-to-endpoint mapping to verify that the endpoint is permitted for the role status and forward the request accordingly (e.g., blocking if not permitted or forwarding if permitted).

An authentication server 175 can be used as desired for authentication of users (e.g., in a username and password scheme or the like).

The web application slices 140A-N then receive the requests for processing and process them accordingly, interacting with the database 190 as needed.

An implementation of the protect system can comprise the plurality of web application slices 140A-N, a mapping between user role statuses and the web application slices, and the reverse proxy 170 that is configured to receive requests, determine a role status, and direct the requests to a web application slice out of the web application slices designated as associated with the determined role status of the requesting user computer. A list of removed endpoints can be used by the reverse proxy 170 to determine when a given request is directed to a removed endpoint and take a counter-intrusion action for the given request.

The system thus provides the full functionality of the complete web application 110, but limits access to those endpoints found to be permitted to be accessed by the role status associated with a request (e.g., the role of the user identifier attempting to access the web application endpoints). For example, if an endpoint is limited to access by a role of "administrator," a request from a user identifier having a role of "user" will not be able to access the endpoint. Furthermore, if there is a vulnerability in a permitted endpoint that allows execution of an arbitrary endpoint, the functionality for impermissible endpoints is missing from the application slices for roles that are not permitted to access the endpoint. So, attempting to execute an impermissible endpoint via accessing a permissible endpoint (e.g., a chaining attack) will also fail.

Instead of, or in addition to implementing a reverse proxy 170 to serve as gatekeeper for the endpoints, it is possible to implement the removed endpoints as stubs in the slices that take no action or take a counter-intrusion action as described herein. The actual functionality for the endpoint can be removed to improve security as described herein.

Any of the systems herein, including the system 100, can comprise at least one hardware processor and at least one memory coupled to the at least one hardware processor.

The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. For example, there can be additional slices or roles. There can be additional configuration. Additional components can be included to implement security, redundancy, load balancing, report design, and the like.

The generate and protect portions of the system 100 can be implemented by different actors, at different times, and at different locations. In practice, the user computer 160 can be operated by a different actor at a different (e.g., remote) location. Both cloud-based an on-premises implementations can be supported.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the application (e.g., source code) 110, slices 140A-N, and the like can be stored in one or more computer-readable storage media or computer-readable storage devices. The technologies described herein can be generic to the specifics of operating systems or hardware and can be applied in any variety of environments to take advantage of the described features.

Example 3

Example Method Implementing Role-Status-Based Web Application Slices

Figure 2:
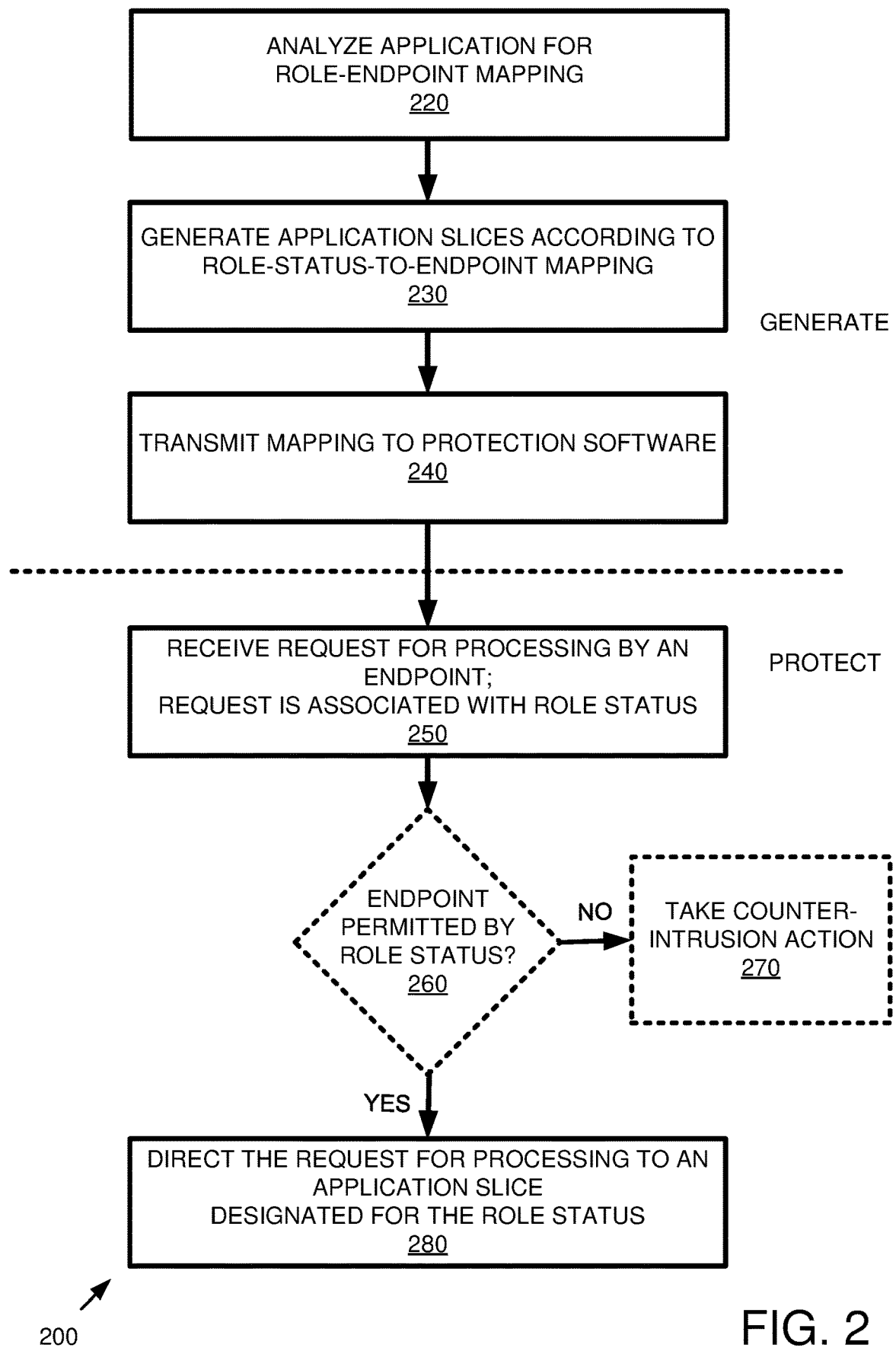
FIG. 2 is a flowchart of an example method of implementing role-status-based web application slices.

FIG. 2 is a flowchart of an example method 200 of implementing role-status-based web application slices and can be performed, for example, by the system of FIG. 1. The automated nature of the method 200 can be used in a variety of situations such as protecting a web application, detecting attempted intrusion, or the like. The method 200 is broadly divided into a generate phase and a protect phase. The two can be performed independently, by different actors, at different times.

At some point, a complete version of a web application is received for implementing role-status-based web application slicing. At 220, the application is analyzed, and such analysis comprises determining a mapping between user roles and web application endpoints of the web application (e.g., generating a role-status-to-endpoint mapping). For example, a determination can be made regarding which roles are authorized to access which web application endpoints. As described herein, a dynamic or static analysis of a complete version of the web application can be performed. Analysis of unauthenticated users can be incorporated by determining which endpoints an unauthenticated user is authorized to access.

At 230, from the complete version of the web application, a plurality of web application slices of the web application are generated according to the role-status-to-endpoint mapping. For example, a given web application slice can be limited to web application endpoints out of the web application endpoints of the web application required to perform processing for a given user role status (e.g., authorized to perform processing responsive to requests from a given user role status).

At 240, the role-status-to-endpoint mapping is transmitted to the protection software, which uses it to protect the web application. As described herein, a list of removed endpoints can also be transmitted to protection software for use in intrusion detection, active defense, or the like. The protection software (e.g., reverse proxy or other mechanism) can then operate based on the mapping, list, and the like when fielding requests to access endpoints of the web application.

Subsequently, a protect phase is implemented. At 250, a request for processing directed to a web application endpoint of a web application configured to receive requests processing is received. The request is associated with a user role status (e.g., initiated from a user identifier associated with a role). Unauthenticated access can be supported (e.g., a role status of "unauthenticated," a user of "unauthenticated," or the like can be used). For authenticated access, the request comes from a computing system at which the user identifier has been authenticated (e.g., the user is logged in as a user identifier associated with a role).

It can then be determined, based on the role-status-to-slice mapping, the application slice designed for handling requests from the user role status from which the request comes.

At 280, the request for processing is directed to the web application slice designated for handling requests from the user role status.

As shown, the list of removed endpoints can be used for intrusion detection. At 260, it is determined whether the endpoint is permitted by the role status. For example, if the endpoint appears on a list of removed endpoints for the role status (e.g., the application slice for the role status), the endpoint is not permitted by the role status. As such, at 270, a counter-intrusion action can be taken as described herein. Different actions can be taken depending on role status, authentication status, or the like, as described herein.

Otherwise, processing can proceed at 280 as described.

As described, the user identifier can be authenticated, or an unauthenticated user can be accessing the web application.

As described herein, a reverse proxy node can receive the request for processing and direct the request application to the web application slice.

As described herein, a request for processing can comprise a uniform resource locator (URL) comprising a name of the web application endpoint.

In some cases, first request can be successful and directed to a web application slice for ordinary processing. A second request for processing to a second web application endpoint can be associated with a second user role status (e.g., be from another user). It can be determined whether the endpoint is mapped as permitted to be accessed by the second role status (e.g., by comparing against a list of removed web application endpoints, checking a mapping of permitted endpoints, or the like). If not, a counter-intrusion action can be taken as described herein.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, receiving a request can be described as sending a request depending on perspective.

Example 4

Example Requests for Processing

In any of the examples herein, a request for processing can be a request directed to a web application endpoint of a web application configured to receive requests for processing. As described herein, in a web application context, a request for processing can originate from a URL in a web browser at a client that is received on the server side. Ordinarily, responsive to receiving such a request, the server computing system initiates functionality (e.g., programming code) for the endpoint (e.g., the web page specified in the URL, with or without any parameters). As described herein, web application slicing technology can be implemented where the request is directed to an appropriate web application slice (e.g., by a reverse proxy node that received the request). If desired, detection of attempts to access impermissible endpoints (e.g., not permitted by the role status) can be implemented and counter-intrusion actions taken accordingly.

Example 5

Example User Roles

In any of the examples herein, a role-based access control security model can be implemented to provide an organized approach to controlling access to resources within an information system. Such a model is designed to ensure that users have appropriate privileges and permissions based on their assigned roles or responsibilities.

In role-based access control, access control is based on defining roles and associating permissions with the roles. A user is assigned one or more roles, and the roles determine the actions that a user can perform and the resources they can access. Although it may be desirable to sometimes assign permissions directly to users, role-based access control involves assigning permissions to roles, and users inherit the permissions through their role assignment.

A user role (or simply "role") can be a label (e.g., name) given to a set of privileges and permissions available to a user. For example, one or more roles can be assigned to a user based on their job function, responsibilities within an organization, status within the information system, and the like. A common role differentiation is between users and administrators. Further roles can be created for shoppers, vendors, managers, employees, human resources personnel, accounting personnel, patients, doctors, security team, or the like. When a user identifier is created, the user identifier can be assigned to a role in a role-based access control scheme.

Permissions can define the actions or operations that a user can perform. Such permissions can include read, write, delete, execute, or other actions, such as being able to create a new account, delete or modify data of other users, access certain reports, or the like. Although permissions can be handled within the logic of a web application based on role, security vulnerabilities often exist in web applications that permit actions not intended by the developers. Thus, many web applications contain such vulnerabilities and do not properly enforce role-based access control.

Accordingly, a mapping between roles and web application endpoints can be determined as described herein. A user accessing the system under a given role will be limited to accessing only those web application endpoints that are permitted as indicated in the mapping. Such an arrangement can be beneficial in avoiding vulnerabilities in the web application, such as being able to chain vulnerabilities together to gain greater access than intended by the web application developers.

Although the term "role" is used herein, the technologies can be applied to a scenario where such a role is an implied role (e.g., various users are assigned named sets of permissions, users have privilege levels, or the like).

Example 6

Example User Role Status

In any of the examples herein, a user role status (or simply "role status") can be a named role (e.g., a role label such as "admin") or indicate a status of unauthenticated (e.g., the user is not yet logged in). In practice, the status of unauthenticated can be treated as a role and mapped to a web application slice as described herein.

An authenticated status can be implemented as its own role or treated as a special case. Implementations can support a role-only scenario (e.g., a role status is limited to roles only and does not include unauthenticated users).

Example 7

Example Web Application Endpoints

In any of the examples herein, a web application endpoint can be accessed to request processing by the web application. In practice, endpoints can be requested by submitting a Uniform Resource Locator (URL) in a web browser, which is directed to a server location that processes the URL and provides a response (e.g., as a web page). To the user, the endpoint may appear to be a web page (e.g., "http://www.hospital.com/login"). The/login endpoint can be setup as part of the web application configuration so that programming code associated with the /login endpoint is executed when the server receives a request for /login. Parameters can be provided if desired (e.g., as part of a GET or POST request or the like).

The browser (e.g., executing in a client computing system) accessing the endpoint can be associated with a user identifier via an authentication process (e.g., username and password or the like). The user identifier is registered on the server side as associated with a user role (e.g., user, administrator, or the like as described herein). In some cases, a user may not yet be authenticated, but application endpoints can still be available as described herein.

Example 8

Example Counter-Intrusion Action

In any of the examples herein, a variety of counter-intrusion actions can be taken in response to detecting an intrusion attempt. Such intrusion attempts can be indicated by an attempt to access an endpoint that is not permissible by a role (e.g., an employee attempting to access an endpoint for administrators only).

For example, such counter-intrusion actions can include logging the attempt to a security log with details including IP address, user identifier, application, application endpoint, timestamp, and the like. Other actions include blocking the IP address associated with the request (e.g., from which the request originates), blocking a user identifier associated with the request, notifying a security manager of an intrusion alert, or the like.

A counter-intrusion action can comprise taking a deceptive action after receiving the request. Such deceptive actions can comprise delayed response, directing the request to a honeypot, providing additional authentication processes, or the like. The threat actor can be deceived into believing that the attempt was successful or may be successful. Meanwhile, the threat actor remains engaged over time and can be more easily tracked.

Different actions can be taken depending on authentication status. For example, a user who has been authenticated may indicate a more serious situation (e.g., a first successful step in an attempt to further penetrate the system), so the request can be directed to a honeypot to keep the threat actor engaged. On the other hand, an authenticated user may be a one-off attempt to test system vulnerabilities that may warrant a different response (e.g., a different honeypot, different alert level, or no response).

Example 9

Example Chaining Attacks

In any of the examples herein, an attempt to perform a chaining attack can be blocked. For example, when a request for processing can comprise a request to perform an arbitrary command (e.g., exploiting a vulnerability in the web application endpoint). Such a command could be another request to another application endpoint as part of a chaining attack. However, it is determined whether the other application endpoint is mapped as permitted to be accessed by the user role status. If not, a counter-intrusion action can be taken, whereby the chaining attack is blocked. Also, the functionality for the other application endpoint is missing from the web application slice, so execution of the other application endpoint is not possible.

Example 10

Example Web Application Slicing

In any of the examples herein, analysis of the web application can be done to determine which role statuses are permitted to access which web application endpoints. Application slicing can then be done by creating different slices for different role statuses, limiting the slices to those endpoints that are permitted to be accessed by the role status designated for a slice. Such activities are part of a generate phase of the technologies that can then be followed by the protect phase as described herein.

Figure 3:
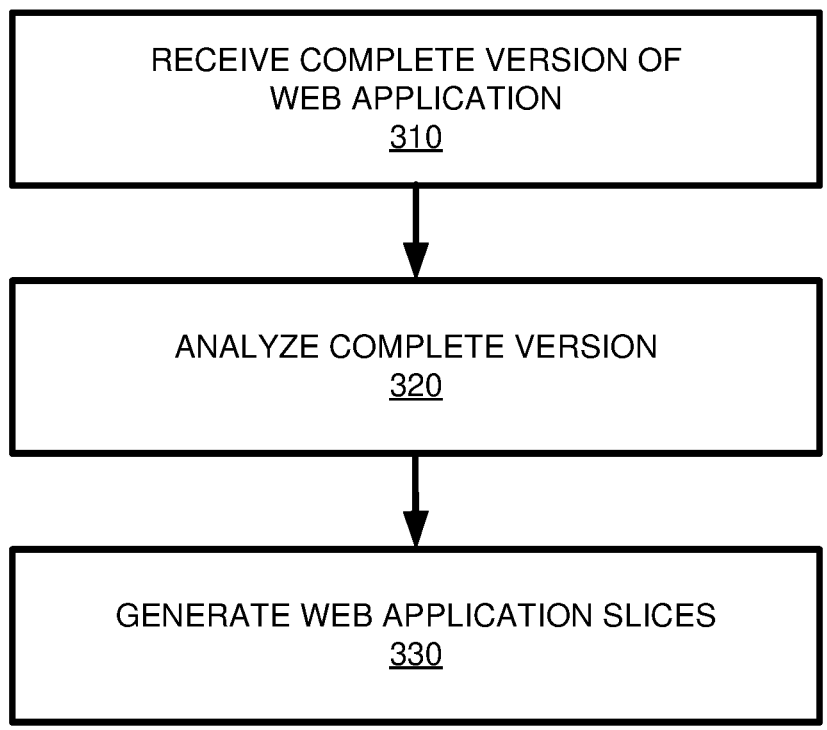
FIG. 3 is a flowchart of an example method of generating web application slices.

FIG. 3 is an example method 300 of generating web application slices that can be used in any of the examples herein and can be performed, for example, by the system shown in FIG. 1 (e.g., by a role analysis tool and slicing tool). The method 300 can be used for the generate phase, followed by the protect phase (e.g., the protect phase shown in FIG. 2).

At 310, a complete version of the web application is received. In practice, source code is provided by which dynamic or static analysis can take place.

At 320, the complete version is analyzed. Analyzing comprises determining a mapping between user role statuses and web application endpoints of the web application (e.g., which role statuses are permitted to access which endpoints).

At 330, a plurality of web application slices are generated from the complete version, wherein a given web application slice is limited to web application endpoints out of the web application endpoints of the web application authorized (e.g., required) to perform processing for a given user role status. As described herein, determining such endpoints can comprise observing execution (e.g., normal, expected execution, not execution by a threat actor) to see which endpoints are accessed, analyzing source code annotations, or the like. Web application endpoints detected as unneeded for a particular user role status can be omitted from inclusion in a web application slice associated with the particular user role status.

If an endpoint is not used as determined by role analysis, it can be removed from the slice for a given role status. Removal of the endpoint from the slice results in a situation where the code is simply not present in the web application slice. So, any attempt to execute code that is not permitted (e.g., by accessing an endpoint that is outside of the scope of the threat actor's role status) will not result in actually executing the code because it is not present in the slice. Thus, web application endpoints detected as unneeded (e.g., not permitted) for a particular user role status can be omitted from inclusion in a web application slice associated with the particular user role status.

As part of the process, the list of removed endpoints can also be output for use in active defense as described herein. Tracking attempts to access such endpoints can provide options for how to respond when such an attempt takes place. For example, counter-intrusion measures can be taken as described herein.

Examples of both static and dynamic approaches to web application slicing are described herein, and other approaches (e.g., a combination of both static and dynamic or the like) can be used to determine how to generate the slices based on an endpoint-to-role-status mapping.

Example 11

Figure 4:
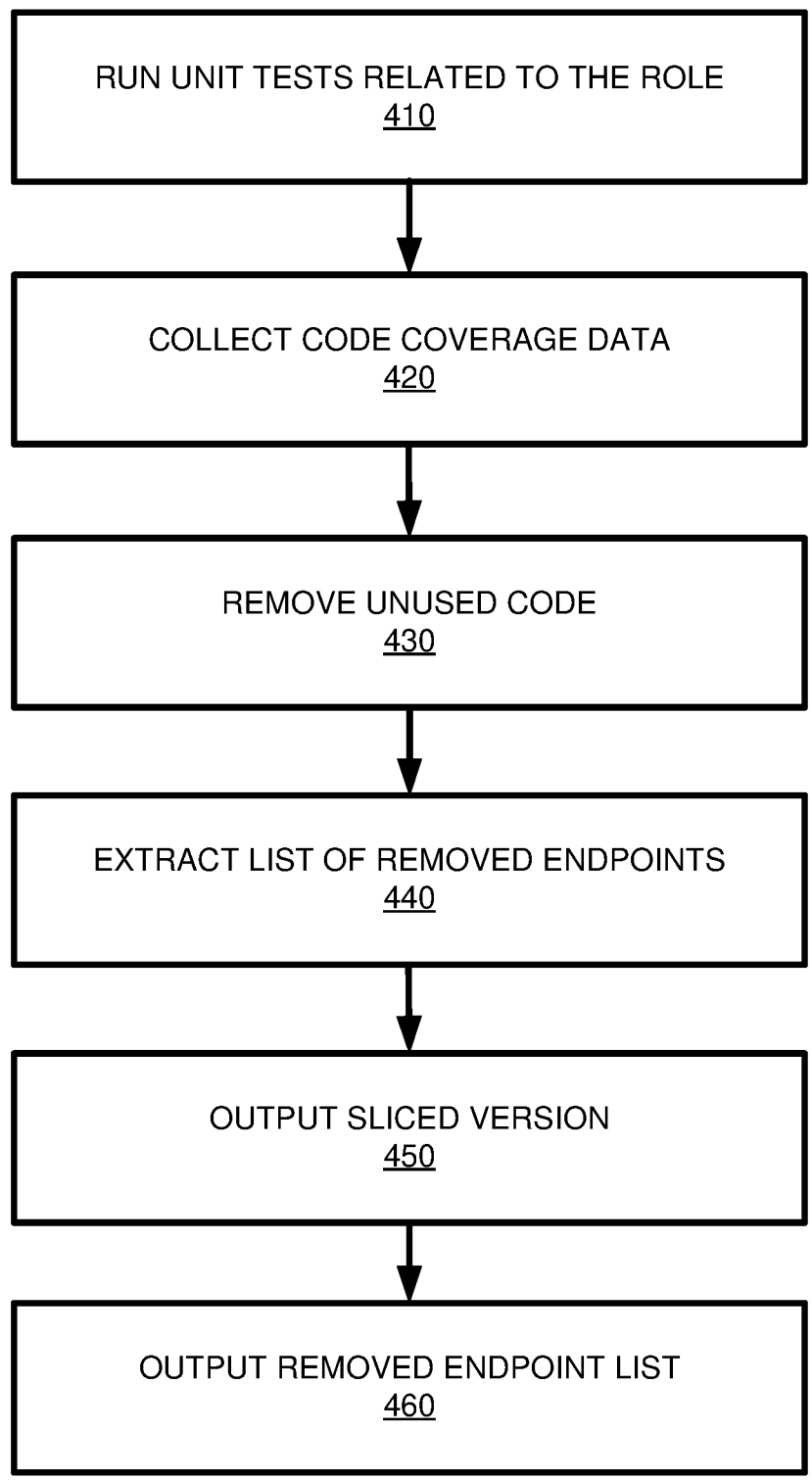
FIG. 4 is a flowchart of an example method of employing a dynamic analysis for web application slices.

Example Method Implementing Dynamic Analysis for Role-Based Web Application Slices FIG. 4 is a flowchart of an example method 400 of employing a dynamic analysis for web application slices and can be performed, for example, by the system of FIG. 1 to achieve slicing such as that shown in FIG. 3. The method 400 can be repeated for plural role statuses (e.g., each known role of the web application, an unauthenticated status, or the like). As described herein, a role status of "unauthenticated" can be supported to generate a web application slice for access by unauthenticated clients.

The method 400 is dynamic in that the web application is executed. The method 400 can analyze a complete version of the web application and determine, via execution of the complete version of the web application, which endpoints of the web application are accessed by the particular role status.

In practice, such a technique can be used for applications that have unit tests related to the functionality of different role statuses. While running the unit tests related to each role status, the code coverage data (e.g., union of tests) can be collected (e.g., by a role analysis tool), and the unused methods can be removed (e.g., by a slicing tool). If desired, the slicing tool can also extract the list of endpoints that are removed.

At 410, unit tests related to the role are executed. For example, the functionality authorized by the role status (e.g., check status, change password, etc.) can be run by executing a complete version of the web application. As a result, certain web endpoints will be accessed.

At 420, code coverage data is collected. For example, it can be determined which endpoints are accessed, which procedures or functions are accessed, or the like.

At 430, unused code is removed. For example, any endpoints that are not accessed during execution for the role can be removed, and a list of them extracted at 440.

At 450, the sliced version of the web application (e.g., the complete version with unused endpoints, code, and the like removed) is output. The sliced version is designated for (e.g., mapped to) a particular role status (e.g., the role status that was tested).

At 460, the list of removed endpoints can also be output for use as described herein.

As described herein, the method 400 can then be repeated for additional role status. For example, application slices can be generated for respective role status (e.g., an application slice can be generated for each role status).

Example 12

Figure 5:
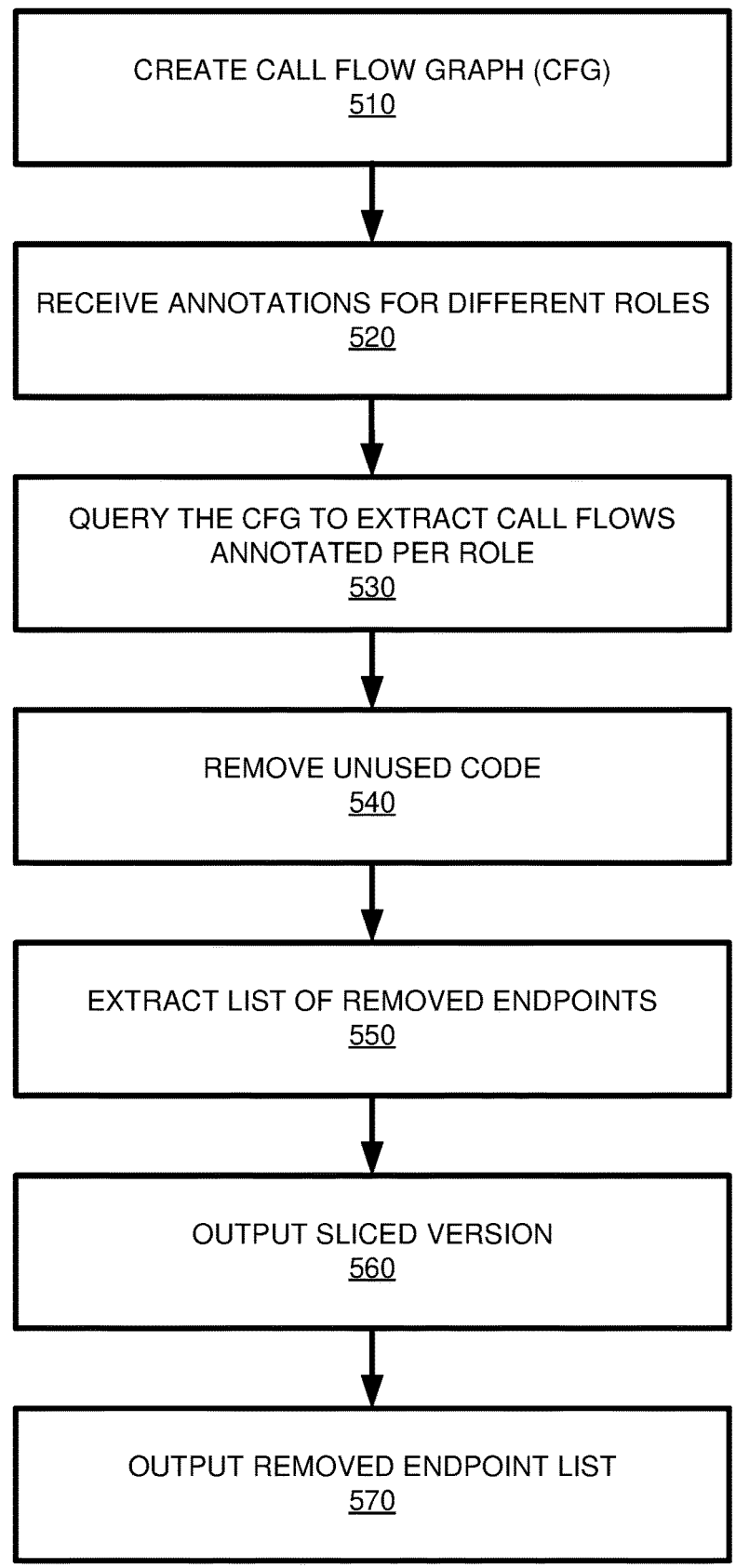
FIG. 5 is a flowchart of an example method of employing a static analysis for web application slices.

Example Method Implementing Static Analysis for Role-Based Web Application Slices FIG. 5 is a flowchart of an example method 500 of employing a static analysis for web application slices and can be performed, for example, by the system of FIG. 1 to achieve slicing such as that shown in FIG. 3. The method 500 can accommodate plural role statuses (e.g., each known role of the web application, an unauthenticated status, or the like). As described herein, a role status of "unauthenticated" can be supported to generate a web application slice for access by unauthenticated clients.

The method 500 is static in that the source code of the web application can be analyzed (e.g., without executing the code). Analyzing the complete version of the web application can determine, via construction of a call flow graph of the application, which endpoints (and other code) of the complete version of the web application are accessed by a particular user role status. User role annotations within the web application can be used.

Slicing can be done by querying the call flow graph based on certain annotations, which can be done by constructing the call flow graph or code property graph of the application source code using a source code analysis tool such as Joern (e.g., from The Bug Hunter's Workbench) or the like. After the graph is constructed, the call flows relevant to a set of endpoints (e.g., for a role status) can be extracted, and the rest of the source code can be removed.

At 510, a call flow graph of the web application is created (e.g., with nodes and edges denoting which code can be reached from which endpoints).

At 520, annotations for the different role statuses are received. For example, source code can include annotations regarding which roles are permitted run sections of the code.

At 530, the call flow graph can be queried to extract call flows annotated (e.g., per role).

At 540, unused code (e.g., for a given role) is removed. A list of removed endpoints can be removed at 550, and the sliced version can be output at 560. In practice, removal, extraction, and output can be repeated (e.g., per role status).

If desired, at 570, the list of removed endpoints can be output for active defense as described herein.

Example 13

Example Static Analysis Scenario

In an example of static analysis to achieve web application slicing, a Java application is built with the Spring Security framework. Based on features of the framework, it is possible to extract the endpoints that relate to certain roles using annotations, the Spring Security configuration, or both. A special role can be used for unauthenticated users (e.g., "USER").

For example, an endpoint can be annotated with @Secured or @RolesAllowed annotations that can be used to parse the Call Property Graph and extract the methods supporting each role. An example source code with annotations is shown below. in the example, the annotations can be manually provided to the slicing tool. The role analysis tool can be implemented by simply extracting the roles from the source code.

```
@RestController
Public class LoginController{
    @RolesAllowed("USER")
    @RequestMapping("/*")
    Public String getUser( )
    {
        Return "Welcome User";
    }
    @RolesAllowed({"USER","ADMIN"})
    @RequestMapping("/admin")
    Public String getAdmin( )
    {
        Return "Welcome Admin";}}
```

In the example, there are two endpoints: "/*" which is mapped to the role "USER" and "/admin" which is mapped to the roles USER and ADMIN.

The annotations can be scraped to create a role-status-to-endpoint mapping. In practice, other frameworks may use different syntax or store role information in configuration information, but the principle remains the same.

Example 14

Example Role-Endpoint Mapping

Figure 6:
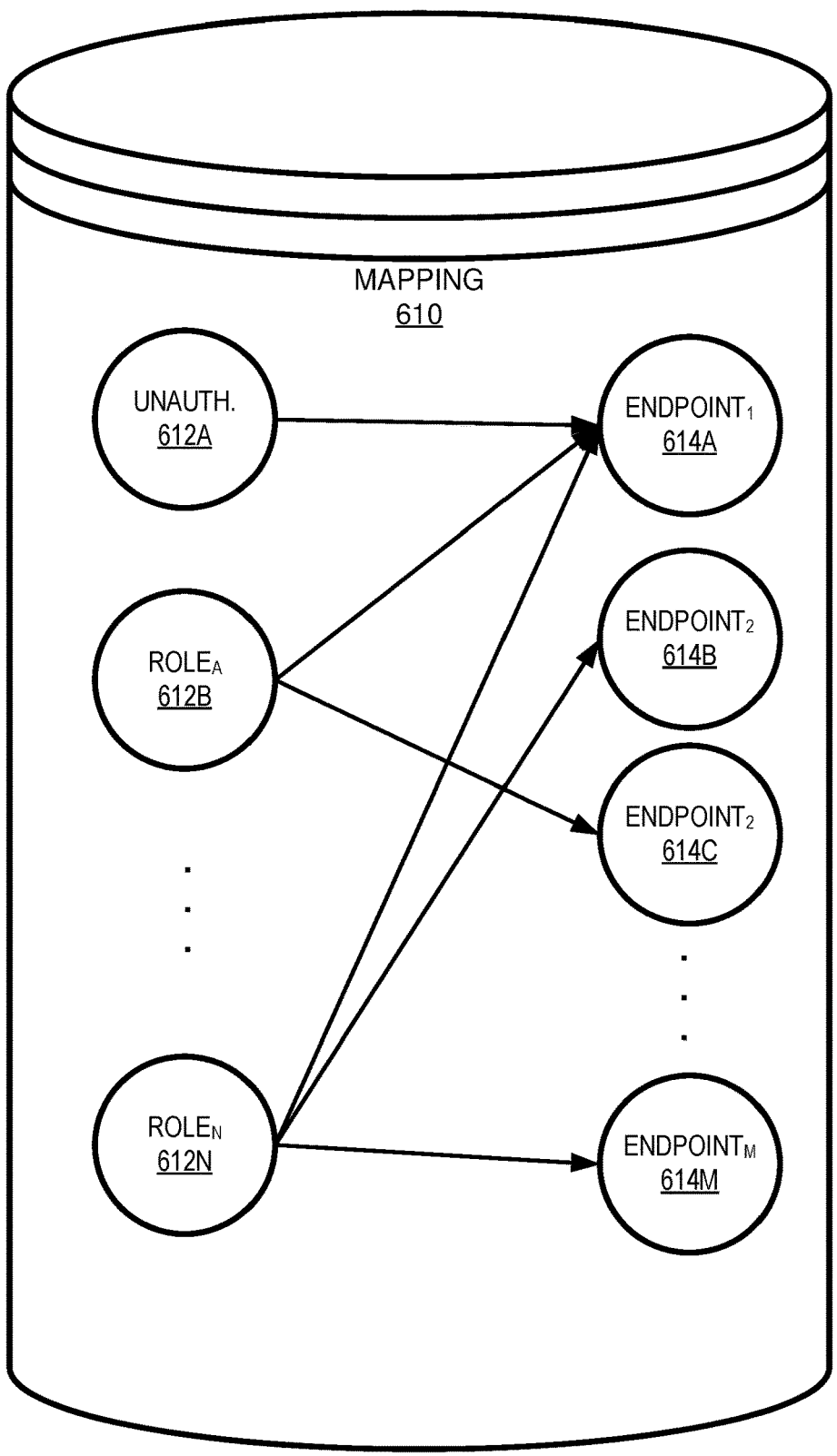
FIG. 6 is a block diagram of an example role-endpoint mapping.

FIG. 6 is a block diagram of an example role-status-to-endpoint mapping 610 that can be used in any of the examples herein. For example, such a mapping 610 can be generated as part of application slicing.

In the example, role status 612A-N are mapped to respective web application endpoints 614A-M. As shown the mapping can be an n:n (or n:m) mapping, in which a role status can be mapped to a plurality of endpoints, and a plurality of role statuses can be mapped to an endpoint. Determining the mapping can be done in a variety of ways as described herein. During code analysis, supporting code for the endpoints can also be included in the mapping (e.g., via dynamic analysis, a control flow graph, or the like). Application slicing can remove the endpoints as well as supporting code (e.g., not used by any endpoint for the given role status).

In practice, the mapping can be represented explicitly as shown or implicitly via data structures that associate role status with endpoints.

Example 15

Example Role-Slice Mapping

Figure 7:
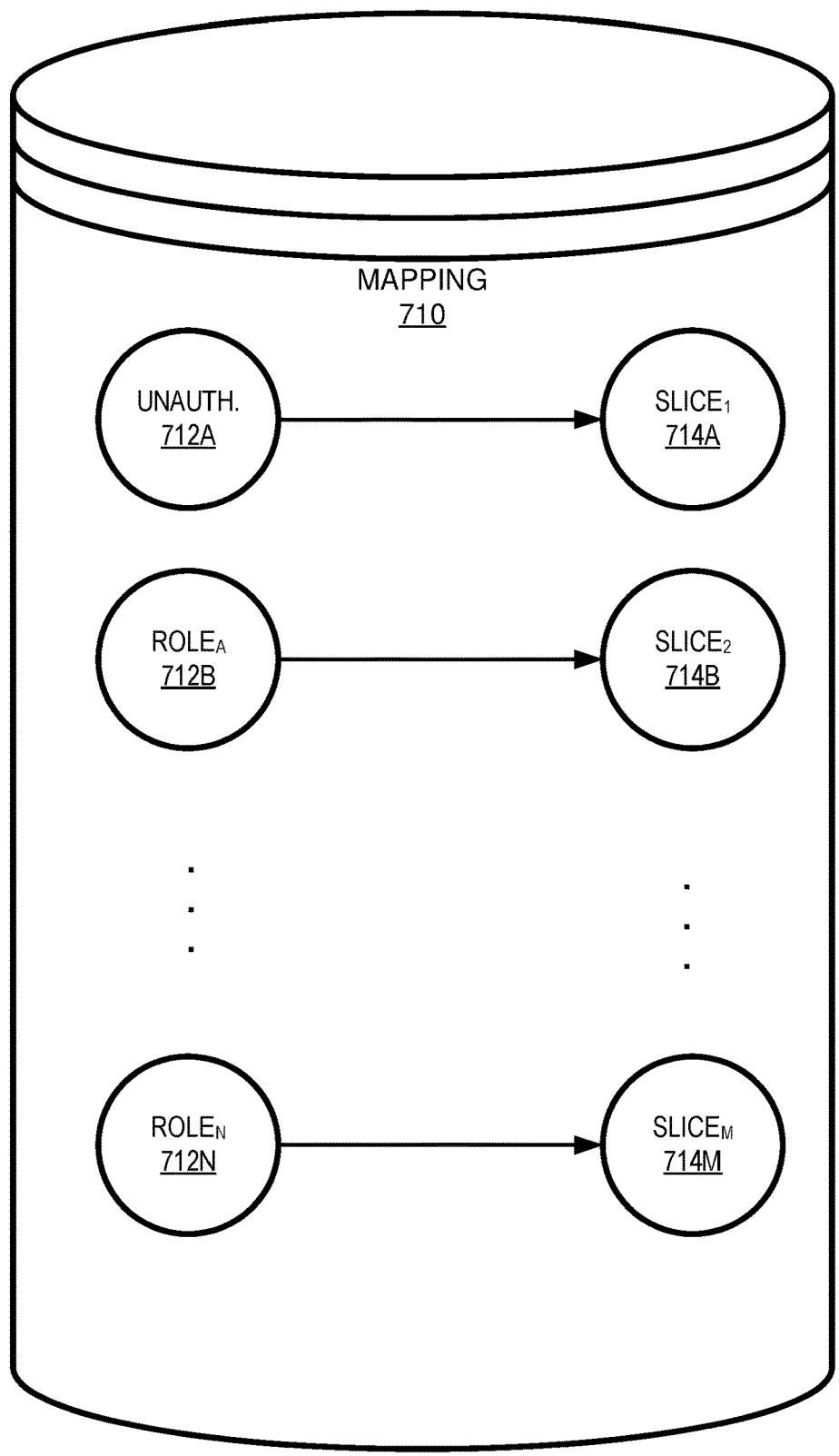
FIG. 7 is a block diagram of an example role-slice mapping.

FIG. 7 is a block diagram of an example an example role-status-to-slice mapping 710 that can be used in any of the examples herein. For example, such a mapping 710 can be generated as part of application slicing.

In the example, role status 712A-N are mapped to respective web application slices 714A-M. The role status can be a role name or unauthenticated. As shown the mapping can be a 1:1 mapping, but it can be that a slice is mapped to by more than one role status. Determining the mapping typically takes place by creating a slice per role status as described herein. A slice is thus limited to the functionality (e.g., endpoints) permitted to be accessed by a role status.

In practice, the mapping can be represented explicitly as shown or implicitly via data structures that associate role status with slices (e.g., when a request comes in associated with a role status, the request is directed to the slice associated with the role status).

Example 16

Example System in Web Application Context

Figure 8:
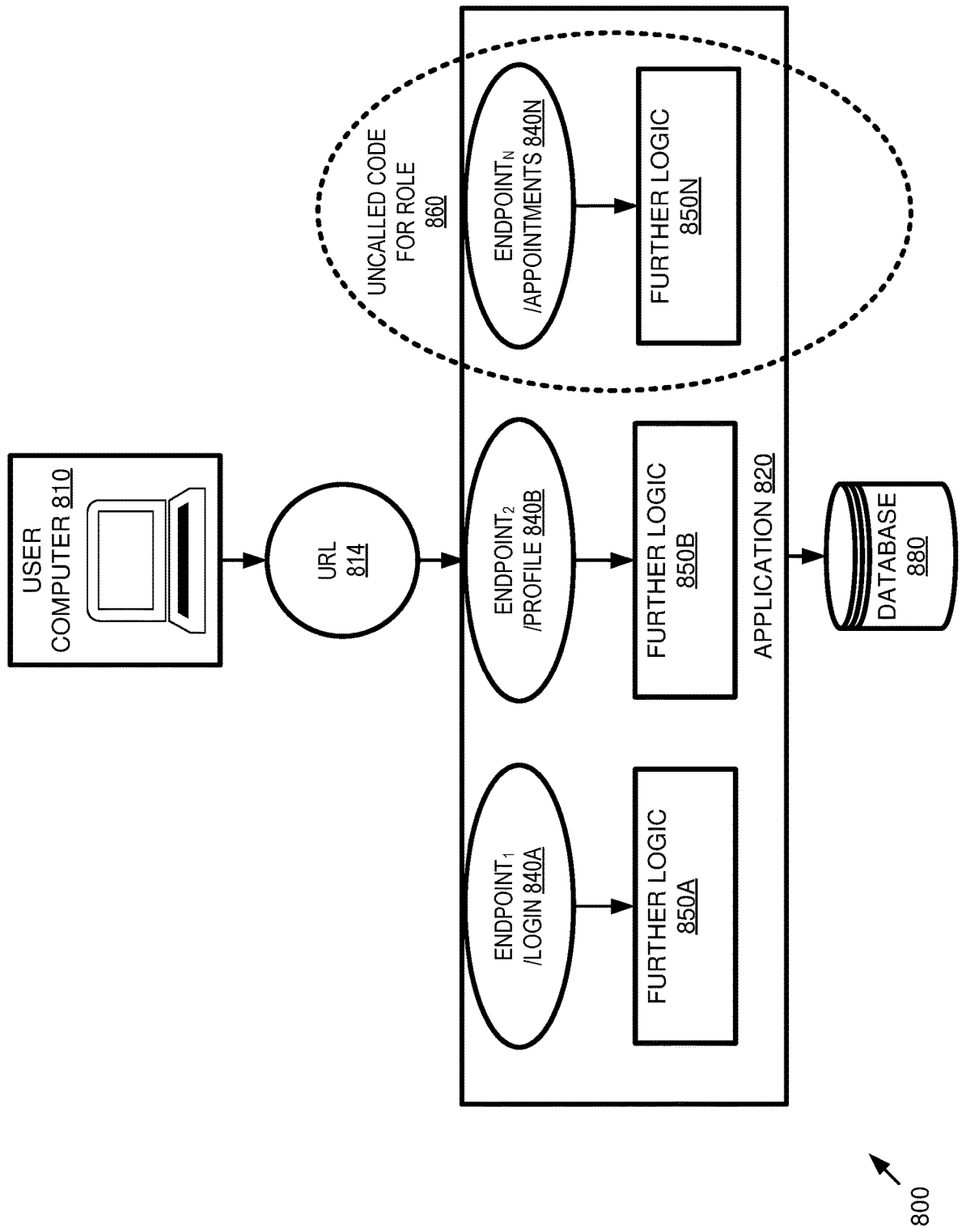
FIG. 8 is a block diagram of an example system implementing the technologies in a web application context.

FIG. 8 is a block diagram of an example system 800 implementing the technologies in a web application context that can be used in any of the examples herein. In the example, a user computer associated with a user role accesses a web application 820 via a Uniform Resource Locator (URL) 814 that requests processing by invoking a web application endpoint 840B (e.g., "/PROFILE"). The URL can contain parameters if desired. Access can be via GET, POST, or other HTTP-based techniques.

To fulfill the request, the application 820 can access further logic 850B. Any of the endpoints 840A-N can invoke further logic 850A-N, and there can be overlap in such further logic (e.g., a plurality of endpoints use the same further logic).

As shown, there may be an endpoint 840N that is not called by the role (e.g., not intended to be called by the role, not observed to be called during processing by the role, not annotated as permitted by the role, or the like). If so, the endpoint 840N and further logic 850N can be removed from the application slice that is invoked when requests come from the role status (e.g., role name, unauthenticated authorization level, etc.) at the user computer 810.

In practice, a database 880 can support the web application 820.

Although not shown, the system 800 can include further details, such as a mapping from role statuses to slices, a list of removed endpoints (e.g., to detect intrusion attempts), or the like.

Example 17

Example Method in Web Application Context

Figure 9:
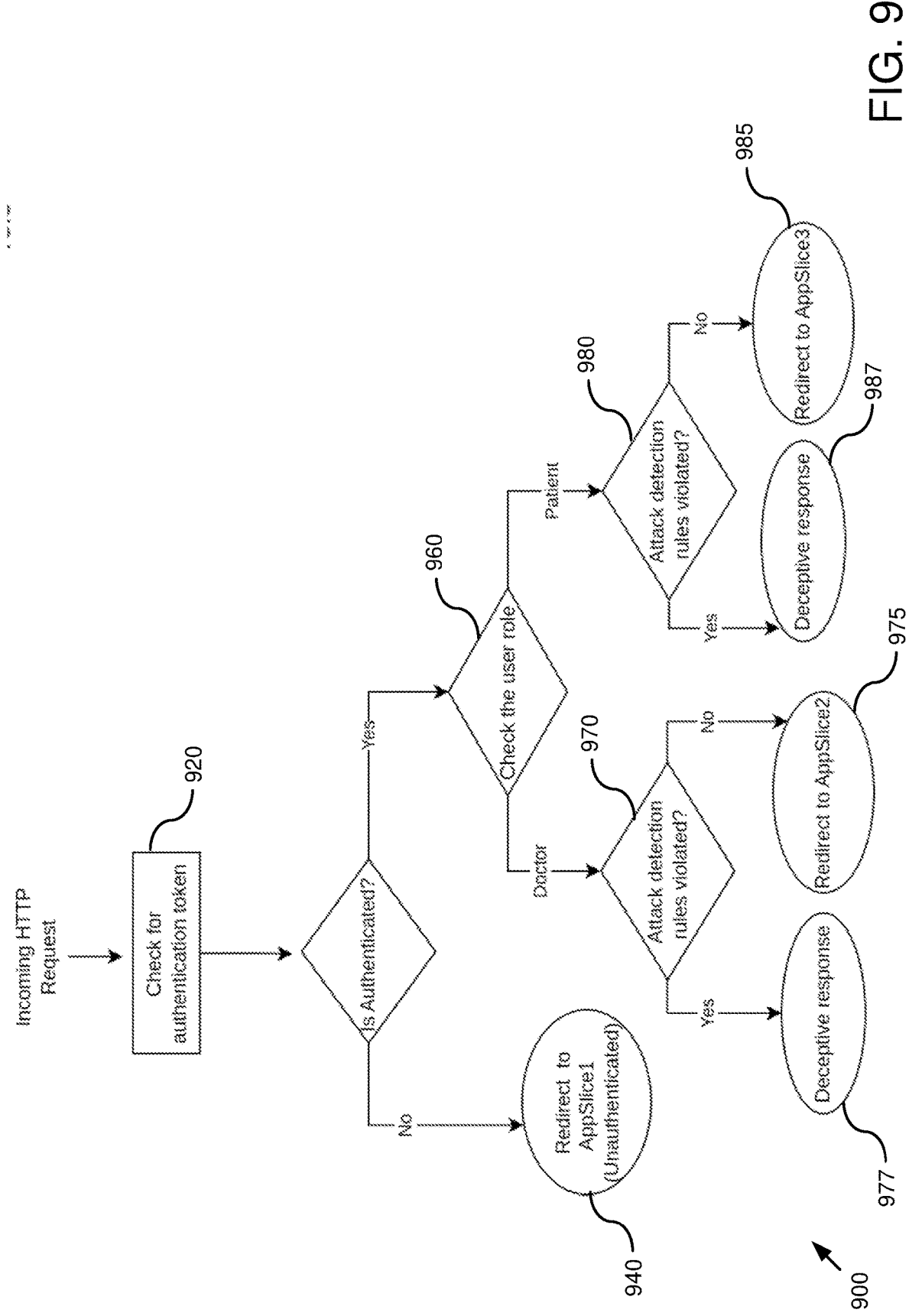
FIG. 9 is a flowchart of an example method implementing the technologies in a web application context.

FIG. 9 is a flowchart of an example method 900 implementing the technologies in a web application context. In the example, an incoming HTTP request from a client is first checked to see if there is an authentication token at 920. If no, the request is directed to AppSlice1 (e.g., designated for Unauthenticated requests) at 940. If yes, the user role is checked at 960, and execution flow branches accordingly. In either scenario, it is checked whether the attack detect rules are violated 970, 980. If not, the request is directed to an appropriate slice (e.g., AppSlice2 for the Doctor role and AppSlice3 for the Patient Role) at 975, 985. Otherwise, a deceptive response can be provided (e.g., as part of a honeypot scenario) at 977, 987.

The method 900 can be performed by a reverse proxy as described herein. The reverse proxy can be responsible for intercepting and checking each request and to decide which version of the sliced application the request should be sent to. The reverse proxy can be provided with or determine the authentication status and the role of the user identifier that is initiating the request. Such information can be kept in a local database, requested from an authentication server, or the like.

The reverse proxy can also accept a list of attack detection points (e.g., the removed endpoints described herein) for roles, and the type of deceptive responses desired for the roles. Depending on the authentication status and role status of the user, the reverse proxy can first check if the attack detection rules are violated (e.g., if a request is for removed endpoint of the role), and then redirect the request to the relevant application slice.

Example 18

Use Cases

The application slicing technologies described herein can be applied in a variety of scenarios. For example, the technologies can be used as an additional defense layer for any web application that has role- or privilege-based access control.

In one example, a vulnerable hospital application defines three roles: doctors, patients, and administrators.

For an unauthenticated user, the application exposes /homepage and /login endpoints.

User role: doctor. If a user logs in as a doctor, the user will have access to /profile, /patients, and /patient_files endpoints. The doctor can view a patient file via a GET /patient_files/[unique_document_id] request. Such a request internally redirects (e.g., via application logic) to /render/://127.0.0.1:8081/documents%[unique_document_id] URL to display the requested file in the browser.

The /render endpoint is vulnerable to the Server Side Request Forgery (SSRF) vulnerability because it makes an internal request to another server (hosted on 127.0.0.1:8081) without proper authorization checks. Thus, the endpoint can be used to read arbitrary files on the web server.

However, the /render endpoint is not accessible from the outside, meaning a doctor cannot directly manipulate the URL.

User role: patient. If the user logs in as a patient, the user will have access to /profile, /appointments, and /upload endpoints.

/upload is used to upload a PDF prior to an appointment with a doctor.

/upload is vulnerable to External XML Entity (XXE) vulnerability, meaning that the attacker can provide an arbitrary command that will be executed by the server.

Thus, one possible attack vector is to manipulate the /render endpoint inside is XXE attack to read arbitrary files on the server.

User role: admin. If the user logs in as an administrator, the user will have access to the /secrets endpoint and view/update different configurations such as database credentials.

Thus, an attacker who can abuse the SSRF vulnerability in the /render endpoint could have access to the /secrets page, even if the user does not have an admin account.

With the application slicing technologies described herein, most of the attack vectors in the example become unexploitable. There are different actual applications running (e.g., different versions or slices of the application) depending on the accessing role.

The application slice relevant to the 'patient' role does not contain the source code for the /render endpoint. Thus, the XXE vulnerability cannot be chained with the SSRF vulnerability.

Furthermore, even if the SSRF vulnerability is exploitable via the 'doctor' role, the attacker cannot access the /secrets endpoint because the application slice will not contain the /secrets endpoint.

As an additional benefit, the removed endpoints can be used as attack detection points and return deceptive responses to the attacker (e.g., slowing down the request, displaying fake data, displaying another authentication page, or the like).

Using the example shown in FIG. 1, AppSlice1 (unauthenticated) could contain the source code to execute the /homepage and /login endpoint.

AppSlice2 (doctor role) would contain the source code for the /profile, /patients, /patient_files, and /render endpoints. Moreover, and request to the /upload endpoint can become an attack detection point.

AppSlice3 (patient role) would contain the source code for /profile, /appointments, and /upload endpoints. Moreover, any request to the /render endpoint can become an attack detection point.

AppSlice4 (admin role) would contain the source code for the /secrets endpoint. Moreover, any request to the /render or /upload endpoints can become attack detection points.

Thus, an attacker who gains access to a user account with a patient role cannot exploit the vulnerability in the/render endpoint because the endpoint is only available to user identifiers with a doctor role.

Although examples using source code are used, the technologies can equally be applied to compiled scenarios (e.g., the compiled code for an endpoint can be omitted from an application slice).

Example 19

Example Implementations

Any of the following can be implemented.
Clause 1. A computer-implemented method comprising:
receiving a request for processing directed to a web application endpoint of a web application configured to receive requests for processing, wherein the request is associated with a user role status;
determining, based on a role-status-to-slice mapping, a web application slice designated for handling requests from the user role status; and
directing the request for processing to the web application slice designated for handling requests from the user role status.
Clause 2. The method of Clause 1, wherein:
a reverse proxy node receives the request for processing and directs the request to the web application slice.
Clause 3. The method of any one of Clauses 1-2, wherein:
the request for processing comprises a URL comprising a name of the web application endpoint.
Clause 4. The method of any one of Clauses 1-3, wherein:
the request for processing comprises a first request associated with a first user role status; and
the method further comprises:
receiving a second request for processing to a second web application endpoint of the web application configured to receive requests for processing, wherein the second request is associated with a second user role status;

determining whether the second web application endpoint is mapped as permitted to be accessed by the second user role status; and responsive to determining that the second web application endpoint is not mapped as permitted by the second user role status, taking a counter-intrusion action.

Clause 5. The method of Clause 4, wherein:

determining that the second web application endpoint is not mapped as permitted by the second user role status comprises comparing against a list of removed web application endpoints.

Clause 6. The method of any one of Clauses 4-5, wherein:

the counter-intrusion action comprises taking a deceptive action after receiving the request.

Clause 7. The method of Clause 6, wherein:

taking the deceptive action comprises directing the second request for processing to a honeypot.

Clause 8. The method of any one of Clauses 4-7, wherein:

the counter-intrusion action comprises notifying a security manager of an intrusion alert.

Clause 9. The method of any one of Clauses 4-8, wherein:

the counter-intrusion action comprises blocking an IP address associated with the second request.

Clause 10. The method of any one of Clauses 4-9, wherein:

the counter-intrusion action comprises blocking a user identifier associated with the second request.

Clause 11. The method of any one of Clauses 1-10, wherein:

the request for processing comprises a first request associated with a first user role status; and the method further comprises:

receiving a second request for processing to a second web application endpoint of the web application configured to receive requests for processing, wherein the second request comprises is associated with a second user role status and comprises a request to perform an arbitrary command, wherein the arbitrary command is a third request for processing to a third application endpoint as part of a chaining attack;

determining whether the third web application endpoint is mapped as permitted to be accessed by the second user role status; and responsive to determining that the second web application endpoint is not mapped as permitted by the second user role status, taking a counter-intrusion action, whereby the chaining attack is blocked.

Clause 12. The method of any one of Clauses 1-11, further comprising:

receiving a complete version of the web application;

analyzing the complete version of the web application, wherein analyzing the complete version of web application comprises determining a mapping between user role statuses and web application endpoints of the web application; and from the complete version of the web application, generating a plurality of web application slices of the web application, wherein a given web application slice is limited to web application endpoints out of the web application endpoints of the web application authorized to perform processing for a given user role status.

Clause 13. The method of any one of Clauses 11-12, wherein:

web application endpoints detected as unneeded for a particular user role status are omitted from inclusion in a web application slice associated with the particular user role status.

Clause 14. The method of any one of Clauses 11-13, further comprising:

for the user roles statuses, outputting respective lists of removed endpoints.

Clause 15. The method of any one of Clauses 11-14, wherein:

analyzing the complete version of the web application comprises performing a dynamic analysis for a particular user role status, wherein the dynamic analysis determines, via execution of the complete version of the web application, which endpoints of the complete version of the web application are accessed by the particular user role status.

Clause 16. The method of any one of Clauses 11-15, wherein:

analyzing the complete version of the web application comprises performing a static analysis for a particular user role status, wherein the static analysis determines, via construction of a call flow graph of the web application, which endpoints of the complete version of the web application are accessed by the particular user role status.

Clause 17. The method of any one of Clauses 11-16, wherein:

analyzing the complete version of the web application comprises performing a static analysis for a particular user role status, wherein the static analysis determines, via user role annotations within the web application, which endpoints of the complete version of the web application are accessed by the particular user role status.

Clause 18. A computing system comprising:

at least one hardware processor;

at least one memory coupled to the at least one hardware processor;

a plurality of web application slices designated as associated with a plurality of respective user role statuses, wherein the web application slices comprise web application endpoints;

a mapping between the user role statuses and the web application slices; and a reverse proxy configured to receive requests to access the web application endpoints from a requesting user computer, determine a role status of the requesting user computer, and direct requests to a web application slice out of the web application slices designated as associated with the determined role status of the requesting user computer.

Clause 19. The system of Clause 18, further comprising:

a list of removed endpoints for respective of the user role statuses;

wherein the reverse proxy is further configured to:

responsive to determining that a given request is directed to a removed endpoint out of the removed endpoints for the determined role status of the requesting user computer, take a counter-intrusion action for the given request.

Clause 20. One or more non-transitory computer-readable media comprising computer-executable instructions that, when executed by a computing system, cause the computing system to perform operations comprising:

receiving a request for processing directed to a web application endpoint of a web application configured to receive requests for processing, wherein the request is associated with a user role;

determining, based on a role-to-slice mapping, a web application slice designated for handling requests from the user role; and directing the request for processing to the web application slice designated for handling requests from the user role;

receiving a second request for processing to a second web application endpoint of the web application configured to receive requests for processing, wherein the second request is associated with a second user role;

determining whether the second web application endpoint is mapped as permitted to be accessed by the second user role; and responsive to determining that the second web application endpoint is not mapped as permitted by the second user role, taking a counter-intrusion action.

Clause 21. One or more non-transitory computer-readable media comprising computer-executable instructions that, when executed by a computing system, cause the computing system to perform the method of any one of Clauses 1-17.

Example 20

Example Advantages

A number of advantages can be achieved via the technologies described herein.

For example, the technologies can reduce the attack surface of a web application by reducing the endpoints (and source code) available to the attacker.

Also, the technologies can provide an additional layer of defense by using the removed source code to come up with attack detection points. Such points can be used to monitor authorization bypass attacks (e.g., via forced browsing or tampering of client-side parameters to elevate privilege).

Finally, a well-orchestrated security plan carried out using the technologies described herein, whether alone or in combination with other technologies can avoid intrusion and detect intrusion attempts, improving overall security of the web application.

Example 21

Example Computing Systems

Figure 10:
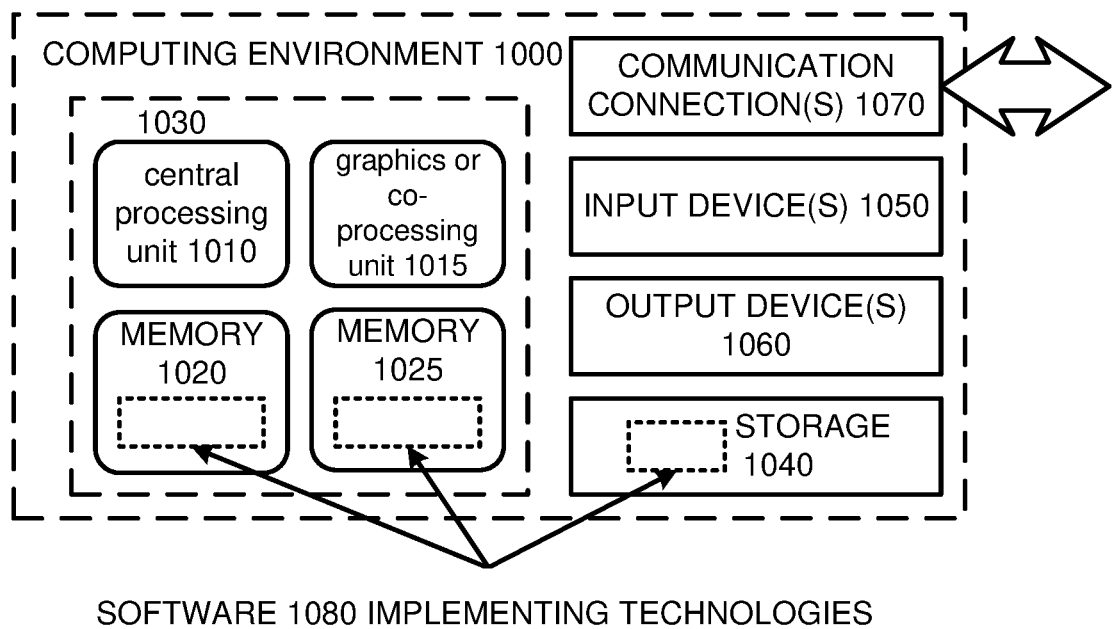
FIG. 10 is a block diagram of an example computing system in which described embodiments can be implemented.

FIG. 10 depicts an example of a suitable computing system 1000 in which the described innovations can be implemented. The computing system 1000 is not intended to suggest any limitation as to scope of use or functionality of the present disclosure, as the innovations can be implemented in diverse computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 can be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 can have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 can be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 can be an input device such as a keyboard, mouse, pen, or trackball, a voice input device, a scanning device, touch device (e.g., touchpad, display, or the like) or another device that provides input to the computing system 1000. The output device(s) 1060 can be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 22

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 23

Example Cloud Computing Environment

Figure 11:
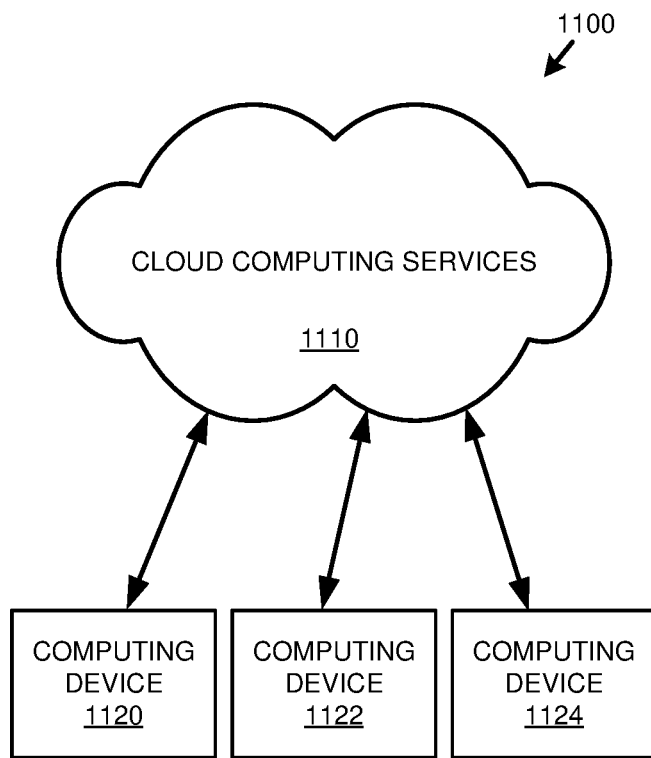
FIG. 11 is a block diagram of an example cloud computing environment that can be used in conjunction with the technologies described herein.

FIG. 11 depicts an example cloud computing environment 1100 in which the described technologies can be implemented, including, e.g., the system 100 of FIG. 1 and other systems herein. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

In practice, cloud-based, on-premises-based, or hybrid scenarios can be supported.

Example 24

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 25

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
   receiving a request for processing directed to a web application endpoint of a web application configured to receive requests for processing, wherein the request is associated with a user role status;
   determining, based on a role-status-to-slice mapping, a web application slice designated for handling requests from the user role status; and
   directing the request for processing to the web application slice designated for handling requests from the user role status.

2. The method of claim 1, wherein:
   a reverse proxy node receives the request for processing and directs the request to the web application slice.

3. The method of claim 1, wherein:
   the request for processing comprises a URL comprising a name of the web application endpoint.

4. The method of claim 1, wherein:
   the request for processing comprises a first request associated with a first user role status; and
   the method further comprises:
   receiving a second request for processing to a second web application endpoint of the web application configured to receive requests for processing, wherein the second request is associated with a second user role status;
   determining whether the second web application endpoint is mapped as permitted to be accessed by the second user role status; and
   responsive to determining that the second web application endpoint is not mapped as permitted by the second user role status, taking a counter-intrusion action.

5. The method of claim 4, wherein:
   determining that the second web application endpoint is not mapped as permitted by the second user role status comprises comparing against a list of removed web application endpoints.

6. The method of claim 4, wherein:
   the counter-intrusion action comprises taking a deceptive action after receiving the request.

7. The method of claim 6, wherein:
   taking the deceptive action comprises directing the second request for processing to a honeypot.

8. The method of claim 4, wherein:
   the counter-intrusion action comprises notifying a security manager of an intrusion alert.

9. The method of claim 4, wherein:
   the counter-intrusion action comprises blocking an IP address associated with the second request.

10. The method of claim 4, wherein:
    the counter-intrusion action comprises blocking a user identifier associated with the second request.

11. The method of claim 1, wherein:
the request for processing comprises a first request associated with a first user role status; and
the method further comprises:
receiving a second request for processing to a second web application endpoint of the web application configured to receive requests for processing, wherein the second request comprises is associated with a second user role status and comprises a request to perform an arbitrary command, wherein the arbitrary command is a third request for processing to a third application endpoint as part of a chaining attack;
determining whether the third web application endpoint is mapped as permitted to be accessed by the second user role status; and
responsive to determining that the second web application endpoint is not mapped as permitted by the second user role status, taking a counter-intrusion action, whereby the chaining attack is blocked.

12. The method of claim 1, further comprising:
receiving a complete version of the web application;
analyzing the complete version of the web application, wherein analyzing the complete version of web application comprises determining a mapping between user role statuses and web application endpoints of the web application; and
from the complete version of the web application, generating a plurality of web application slices of the web application, wherein a given web application slice is limited to web application endpoints out of the web application endpoints of the web application authorized to perform processing for a given user role status.

13. The method of claim 12, wherein:
analyzing the complete version of the web application comprises performing a dynamic analysis for a particular user role status, wherein the dynamic analysis determines, via execution of the complete version of the web application, which endpoints of the complete version of the web application are accessed by the particular user role status.

14. The method of claim 12, wherein:
analyzing the complete version of the web application comprises performing a static analysis for a particular user role status, wherein the static analysis determines, via construction of a call flow graph of the web application, which endpoints of the complete version of the web application are accessed by the particular user role status.

15. The method of claim 12, wherein:
analyzing the complete version of the web application comprises performing a static analysis for a particular user role status, wherein the static analysis determines, via user role annotations within the web application, which endpoints of the complete version of the web application are accessed by the particular user role status.

16. The method of claim 12, wherein:
web application endpoints detected as unneeded for a particular user role status are omitted from inclusion in a web application slice associated with the particular user role status.

17. The method of claim 12, further comprising:
for the user roles statuses, outputting respective lists of removed endpoints.

18. A computing system comprising:
at least one hardware processor;
at least one memory coupled to the at least one hardware processor;
a plurality of web application slices designated as associated with a plurality of respective user role statuses, wherein the web application slices comprise web application endpoints;
a mapping between the user role statuses and the web application slices; and
a reverse proxy configured to receive requests to access the web application endpoints from a requesting user computer, determine a role status of the requesting user computer, and direct requests to a web application slice out of the web application slices designated as associated with the determined role status of the requesting user computer.

19. The system of claim 18, further comprising:
a list of removed endpoints for respective of the user role statuses;
wherein the reverse proxy is further configured to:
responsive to determining that a given request is directed to a removed endpoint out of the removed endpoints for the determined role status of the requesting user computer, take a counter-intrusion action for the given request.

20. One or more non-transitory computer-readable media comprising computer-executable instructions that, when executed by a computing system, cause the computing system to perform operations comprising:
receiving a request for processing directed to a web application endpoint of a web application configured to receive requests for processing, wherein the request is associated with a user role;
determining, based on a role-to-slice mapping, a web application slice designated for handling requests from the user role; and
directing the request for processing to the web application slice designated for handling requests from the user role;
receiving a second request for processing to a second web application endpoint of the web application configured to receive requests for processing, wherein the second request is associated with a second user role;
determining whether the second web application endpoint is mapped as permitted to be accessed by the second user role; and
responsive to determining that the second web application endpoint is not mapped as permitted by the second user role, taking a counter-intrusion action.

* * * * *